US011687314B2

(12) United States Patent
Beiser et al.

(10) Patent No.: US 11,687,314 B2
(45) Date of Patent: Jun. 27, 2023

(54) DIGITAL AUDIO WORKSTATION WITH AUDIO PROCESSING RECOMMENDATIONS

(71) Applicant: Waves Audio Ltd., Tel Aviv (IL)

(72) Inventors: Inon Beiser, Raanana (IL); Meir Shaashua, Tel Aviv (IL); Itai Neoran, Beit Hananya (IL)

(73) Assignee: Waves Audio Ltd., Tel Aviv (IL)

( * ) Notice: Subject to any disclaimer, the term of this patent is extended or adjusted under 35 U.S.C. 154(b) by 148 days.

(21) Appl. No.: 17/319,112

(22) Filed: May 13, 2021

(65) Prior Publication Data

US 2021/0357174 A1    Nov. 18, 2021

(30) Foreign Application Priority Data

May 18, 2020 (GB) .................................... 2007298

(51) Int. Cl.
| | | |
|---|---|---|
| *G06F 3/16* | (2006.01) | |
| *G06F 16/683* | (2019.01) | |
| *G10L 21/14* | (2013.01) | |
| *G10L 25/18* | (2013.01) | |
| *G10L 25/24* | (2013.01) | |

(Continued)

(52) U.S. Cl.
CPC ............ *G06F 3/165* (2013.01); *G06F 16/683* (2019.01); *G10L 21/14* (2013.01); *G10L 25/18* (2013.01); *G10L 25/24* (2013.01); *G10L 25/51* (2013.01); *G06N 3/08* (2013.01)

(58) Field of Classification Search
CPC ...... G06F 3/165; G06F 16/683; G06F 16/635; G06F 16/64; G06F 16/686; G10L 21/14; G10L 25/18; G10L 25/51; G10L 21/00; G10L 25/48; G10L 25/27; G10L 25/30; G10L 25/54; G06N 3/08; G06N 20/00; G10H 2210/041; G10H 2210/056; G10H 2220/116; G10H 2240/131; G10H 1/46; G10H 2250/311; G10H 2210/105; H04R 3/005; G11B 27/031

See application file for complete search history.

(56) References Cited

U.S. PATENT DOCUMENTS

| | | | |
|---|---|---|---|
| 9,654,869 B2 | 5/2017 | Reiss et al. | |
| 10,228,901 B1 * | 3/2019 | Hirst ....................... | A63F 13/40 |
| 2016/0371051 A1 * | 12/2016 | Rowe ...................... | G06F 3/165 |

(Continued)

FOREIGN PATENT DOCUMENTS

| | | | | |
|---|---|---|---|---|
| EP | 2485213 A1 * | 8/2012 | ............. | G11B 27/02 |
| WO | WO-2013167884 A1 * | 11/2013 | ............... | G10H 1/02 |

OTHER PUBLICATIONS

GB2007298.9 1st combined search and examination.
Applicant's letter in response to first examination report.

*Primary Examiner* — Akelaw Teshale
(74) *Attorney, Agent, or Firm* — Dr. Hanan Farber Patent Agent Ltd.

(57) ABSTRACT

Presentation of a recommendation to a user for individual processing of audio tracks in a digital audio workstation. Training audio tracks are provided to a human sound mixer and responsive to the training audio tracks individually processed training audio tracks are received from the human sound mixer. The training audio tracks and the individually processed training audio tracks are input to a machine to train the machine. Audio processing operations are output from the trained machine and stored in a record of a database.

16 Claims, 4 Drawing Sheets

(51) Int. Cl.
*G10L 25/51* (2013.01)
*G06N 3/08* (2023.01)

(56) References Cited

U.S. PATENT DOCUMENTS

| | | | | |
|---|---|---|---|---|
| 2017/0338903 | A1* | 11/2017 | Oldfield | G10H 1/0008 |
| 2019/0018645 | A1* | 1/2019 | McClellan | G06F 3/165 |
| 2020/0342857 | A1* | 10/2020 | Moreno | G10L 15/30 |
| 2020/0394999 | A1* | 12/2020 | Levine | G11B 27/031 |
| 2021/0055796 | A1* | 2/2021 | Mansbridge | G06F 3/04812 |

* cited by examiner

DIGITAL AUDIO WORKSTATION WITH
AUDIO PROCESSING RECOMMENDATIONS

BACKGROUND

1. Technical Field

Aspects of the present invention relate to digital signal processing of audio signals, and particularly to a digital audio workstation for processing audio tracks and audio mixing.

2. Description of Related Art

A digital audio workstation (DAW) is an electronic device or software application for recording, editing and producing audio files such as musical pieces, speech or sound effects. DAWs typically provide a user interface that allows the user to record, edit and mix multiple recordings and tracks into a mixed audio production. Modern computer-based DAWs support software plug-ins, each having its own functionality, which may expand the sound processing capabilities of the DAW. There are software plug-ins, for example, for equalization, limiting, compression, reverberation and echo. Software plug-ins may provide further audio sources within a DAW such as virtual instruments.

U.S. Pat. No. 9,654,869 discloses mixing audio signals. Audio features are extracted from each of multiple audio signals. For each of the audio signals an associated processing control function is determined in accordance with the extracted audio features. The audio signals are processed in accordance with the associated processing control function and the processed audio signals are output.

BRIEF SUMMARY

Various methods and systems are described herein for presentation of a recommendation to a user for individual processing of audio tracks in a digital audio workstation. Multiple original audio tracks are input to a trained machine. Audio features are extracted from the original audio tracks. Responsive to the extracted audio features of the original audio tracks, a recommendation is selected from a database for individual audio processing of the audio tracks. The recommendation is presented to a user and processing of the audio tracks may be enabled according to the recommendation. The processed audio tracks may be mixed into a playable audio production and the audio production may be played. The database is produced by providing multiple training audio tracks. Audio features of the training audio tracks are extracted and the audio features of the training audio tracks are stored in a record of the database. The recommendation is selected from the database responsive to a similarity metric between the extracted audio features of the original audio tracks and the extracted audio features of the training audio tracks.

The database may be produced by providing the training audio tracks to a human sound mixer. Individually processed training audio tracks may be received from the human sound mixer. The training audio tracks and the individually processed training audio tracks may be input to a machine to train the machine. Audio processing operations may be output from the trained machine emulating audio processing performed by the human sound mixer of the training audio tracks. The audio processing operations may be stored in a record of the database.

An audio mix may be received from the human sound mixer of the individually processed audio tracks. An audio mix feature may be extracted of the audio mix. The audio mix feature may be stored in a record of the data base. A target feature of the audio mix may be received, e.g. input from a user. Responsive to the audio mix feature of the audio mix stored in the database and the target feature of the audio mix, a recommendation may be selected for audio processing of the audio tracks. The recommendation may be selected based on a similarity between the target feature of the audio mix received from a user and the audio mix feature previously stored in a record of the data base.

A target audio feature may be input from a user for processing the original audio tracks. A recommendation for audio processing of the original audio tracks may be selected responsive to the target audio feature.

A tag may be input by a user describing an attribute of the audio tracks or of the playable audio production. The recommendation may be selected responsive to the tag. Prior to inputting the audio tracks to the trained machine, the audio tracks may be preprocessed by a short time Fourier transform (STFT) or by converting into Mel Frequency Cepstral Coefficients (MFCC).

The original audio tracks may be processed according to the recommendation to produce thereby individually processed audio tracks. An audio feature may be extracted of the individually processed audio tracks. The recommendation may be refined responsive to the extracted audio feature of the individually processed audio tracks and a target audio feature input from a user.

Various user interfaces of a digital audio workstation are disclosed herein including: a visual representation of multiple audio tracks for individual audio processing. Original audio tracks are input to a trained machine to output therefrom a recommendation including a selection from a database for individual audio processing of the original audio tracks. The user interface includes: a presentation of the recommendation to a user, a mechanism for processing individually the original audio tracks according to the recommendation, a mechanism for mixing the processed audio tracks into a playable audio production and an option enabling playing the audio production. The user interface may further include a mechanism for inputting a target audio feature for processing at least one of the audio tracks. The recommendation may be responsive to the target audio feature. The user interface may further include a mechanism for inputting a target audio feature for mixing the processed audio tracks into a playable audio production and the recommendation is responsive to the target audio feature for mixing. The user interface may further include a field for a user to input a tag. The tag may describe an attribute of the audio tracks or of the playable audio production. The recommendation may be selected responsive to the tag.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1:
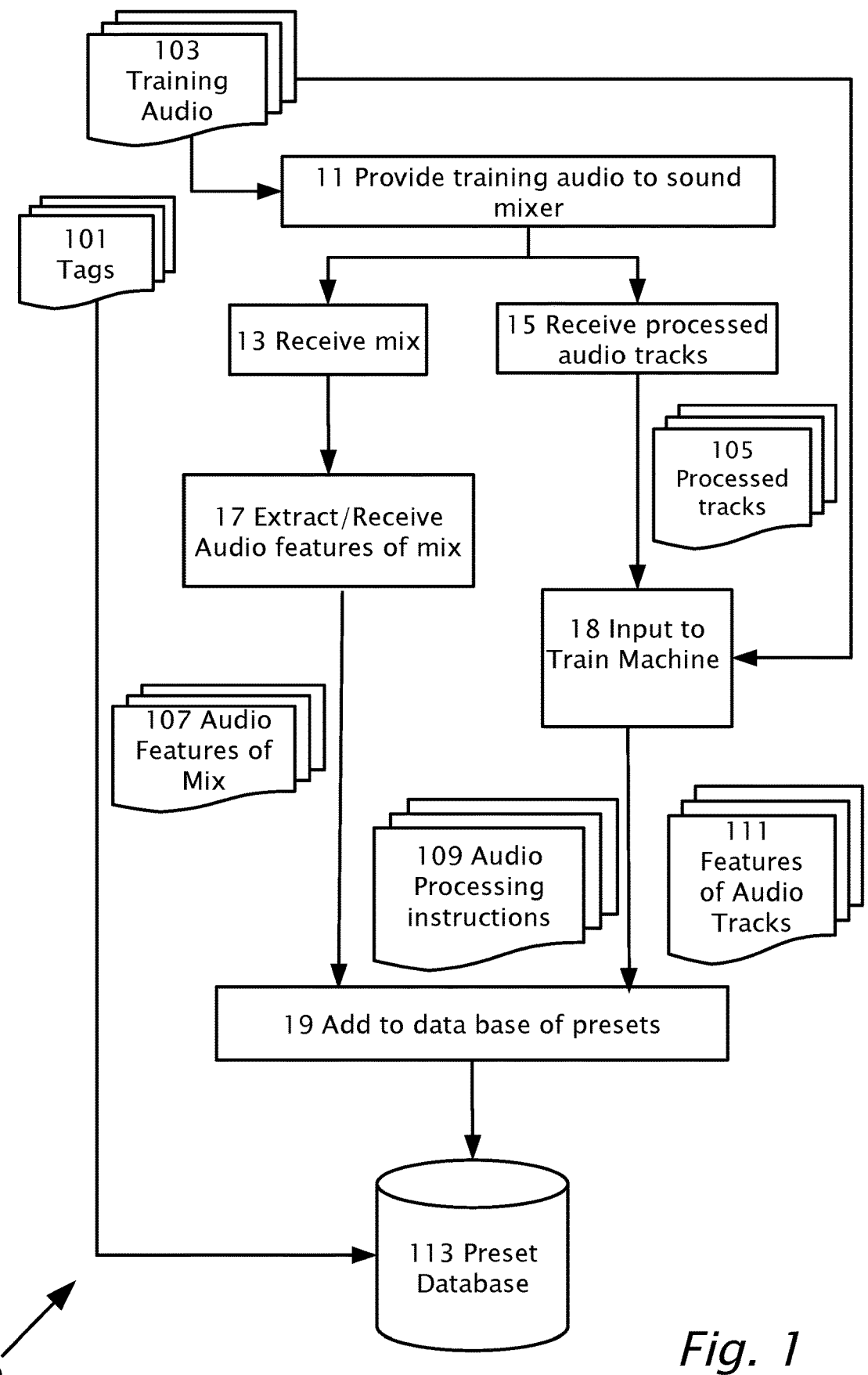
FIG. 1 is a flow diagram illustrating a method for training a machine and building a database, according to features of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to the like elements throughout. The features are described below to explain the present invention by referring to the figures.

By way of introduction, various embodiments of the present invention are directed to individually processing and mixing multiple tracks of audio into a mixed audio playable file which includes audio content from the multiple tracks with the multiple tracks having independent levels.

For example, multiple microphones are generally used to record a song and not necessarily at the same time. Usually there is a separate audio source file for each recorded instrument or multiple audio files from multiple microphones of the same instrument. The final song includes one mixed and audio processed file prepared from the multiple tracks of audio source(s) in order to provide a playable digital file with a pleasant audio experience.

Currently, audio mixing is generally performed by human audio mixing experts who select individual tracks of audio source and decide on respective audio processing functions to apply to each of the selected audio sources before mixing the tracks. According to features of the present invention, a machine is trained to emulate the human behavior of individual audio track processing and mixing. Using the trained machine, a recommendation is made for processing one or more audio tracks. The recommendation may be selected by the system and presented to the user based on audio features or other information, e.g. tags pertaining to the audio source tracks, target audio features of the processed audio tracks or target audio features of the mixed production. The target audio features may be specified by the user or desired features attributed to the user. A recommended audio processing operation or series of operations is selected individually for audio tracks from a database of previously produced audio processing options.

The term "preset" as used herein refers to one or more audio processing steps which have been previously defined and stored in a database preferably with metadata describing context of when the audio processing steps may be used. The "preset" as used herein, is more general than a set of parameters for known audio software plug-ins e.g. equalization, compression, reverberation, and may specify a generalized audio processing function and/or combination of previously defined audio processing functions. For example, a preset may contain a reverberation audio effect connected in series with audio compression and summed in parallel with additional equalization. Moreover, each of the parameters of the equalization, compression and reverberation in the former example may be changed to create a new preset each with a different tuning of internal parameters.

Referring now to the drawings, reference is now made to FIG. 1, a flow diagram 10 illustrating a method for training a machine and building a database 113, according to features of the present invention. Audio tracks 103, as recorded for instance from multiple microphones may be provided (step 11) to a human sound mixing expert. Processed audio tracks 105 may be subsequently received (step 15) from the sound mixing expert. The audio mix of audio tracks 103 may also be received (step 13) from the sound mixing expert. Audio tracks 103 and processed audio tracks 105 may be input to a machine to train the machine and output therefrom audio processing instructions 109 emulating audio processing from audio tracks 103 to processed audio tracks 105. Audio features 111 of training audio tracks 103 and/or processed tracks 105 may also be output from the trained machine. Audio features 107 of the mix may be separately received and/or extracted from the mix (step 17). Audio features 111 of training audio tracks 103 and/or of processed tracks 105, audio processing instructions 109 and audio features 107 of the mix may be added (step 19) to a database 113 of presets. After the recommendation system is in use, according to features of the present invention (FIG. 2), anonymous usage statistics may be gathered from users and input (step 18) to further train the machine in order to optimize the recommendation system and modify extracted audio features 111.

Preset Database 113 Record

Database 113 record of a preset, according to features of the present invention, may include: an identifier of the preset, text description of the preset, tags 101 which may be keywords describing properties of the preset such as the instrument type, e.g. vocal, instrumental, mixed, specific instruments, genre, style, mood or textual descriptions, e.g. bright/dark. In addition, mix tags may be included with keywords describing attributes of the mix which may be produced using this preset. Database 113 record of a preset may include track audio features that specify original audio that the present preset is suitable to process, in the form of unprocessed audio samples or audio features previously extracted. Database 113 record of a preset may further include a set of audio features 107 that characterize the audio mix produced using processing of the present preset, in the form of unprocessed audio samples or audio features 111 previously extracted. Database 113 may include a subset of features/tags, for example: tags 101 and not audio features 111, or tags 101, audio features 111 and not mix tags 101/mix audio features 107.

Recommendation System

Figure 2:
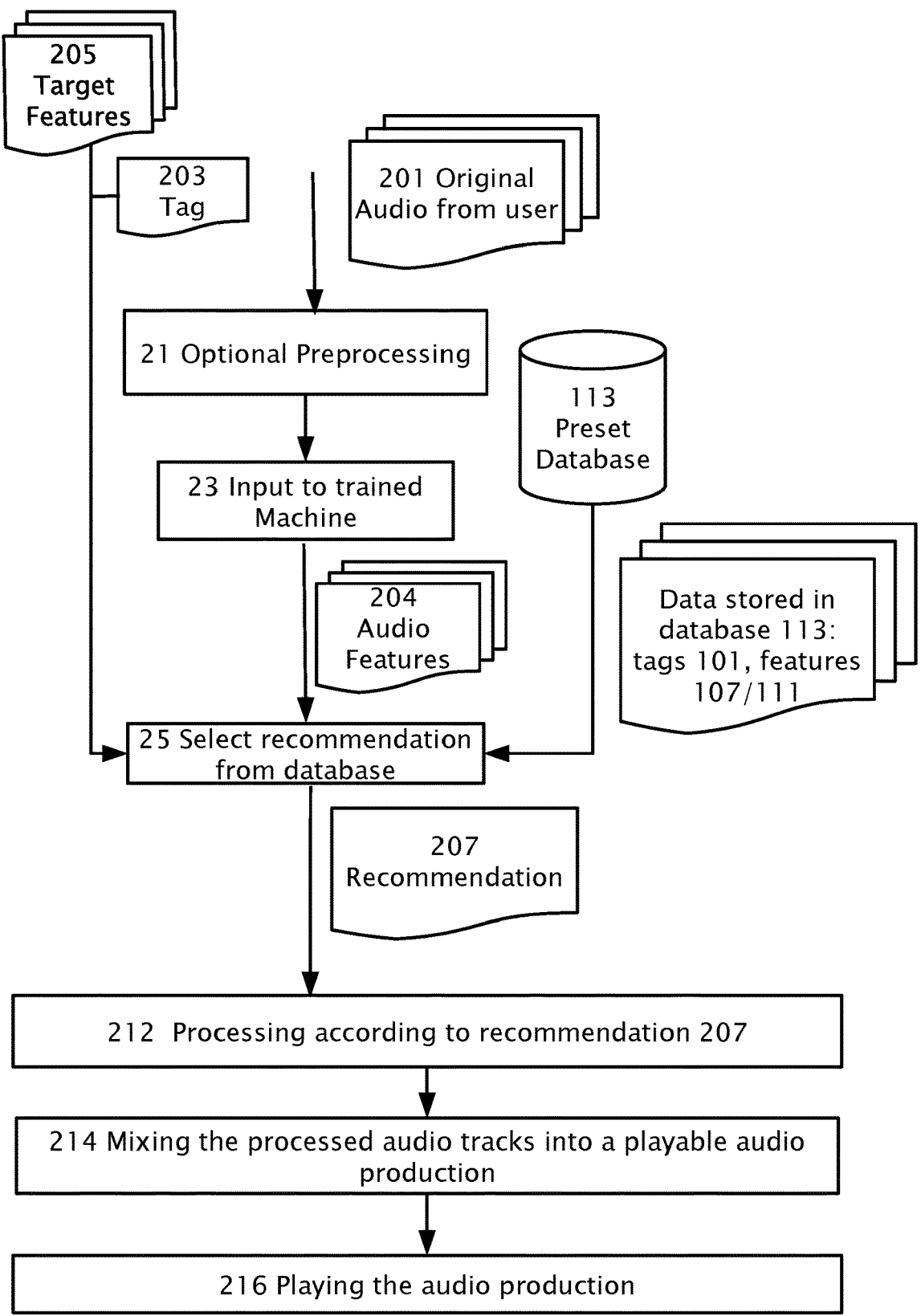
FIG. 2 is a flow diagram illustrating a method of using the trained machine and database for providing a recommendation for individual processing of audio tracks, according to features of the present invention.

Reference is now made to FIG. 2, which illustrates a flow diagram 20 of a method of using a trained machine and database 113 for providing a recommendation 207 for individual processing of original audio tracks 201 from a user, according to features of the present invention. Original audio tracks 201 from user may undergo pre-processing (step 21) such as parsing into short time intervals, of e.g. less than one second, followed by a short time Fourier transform (STFT) or conversion into Mel Frequency Cepstral Coefficients (MFCC). Raw audio 201 and/or previously processed (step 21) audio may be input (step 23) to a previously trained machine. Audio features 204 may be extracted from original audio tracks 201 from user. Target features 205 and tags 203 may be provided manually by the user, e.g. using an input on a graphical user interface. The user may provide only a sub-set of target features/tags 205, 203. For example, the user may provide tags 203 and not target features 205; only track tags/track audio features and not mix tags/mix audio features; or any other subset of target features 205/tags/user information 203.

Figure 2A:
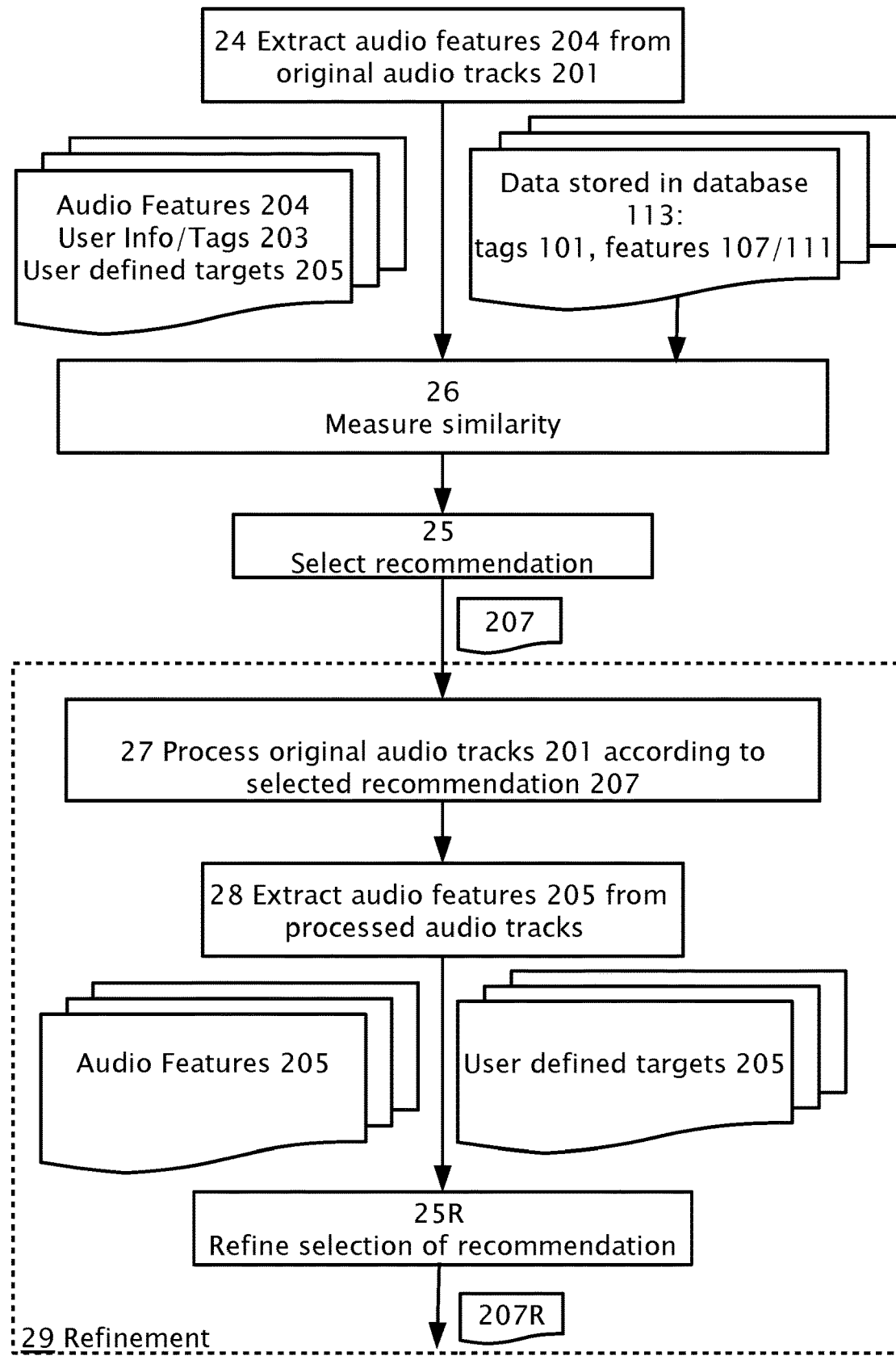
FIG. 2A is a flow diagram illustrating further details of the method of FIG. 2, for refining the selection of a recommendation, according to features of the present invention.

Reference is now also made to FIG. 2A a flow diagram illustrating in further detail, selection of a recommendation for audio processing, according to features of the present invention. In step 24, audio features 204 are extracted from original audio tracks 201. Recommendation 207 may be selected (step 25) based on similarity, minimizing distance in feature space (step 26) between: (i) audio features 204 extracted from original audio tracks 201, user defined target audio features 205 and/or tags 203, i.e. what the user is looking for, and; (ii) tags 101, features 107, 111 stored in database 113. Recommendation 207 may be refined (block 29) by processing (step 27) original audio tracks 201 according to selected recommendation 207 and extracting (step 28) audio features 204 from processed audio tracks. Recommendation 207 may be refined (step 25R) by minimizing distance between audio features 204 extracted from processed audio tracks and user defined target features 205 to produce a refined recommendation 207R. Refinement (step 25R) may be performed by selecting a different time portion of recommendation 207 or selecting a preset 207R different from recommendation 207 selected in step 25.

Referring back to FIG. 2, after recommendation 207 is selected in step 25, original audio tracks 201 may be processed (step 212) according to recommendation 207. The processed audio tracks may be mixed (step 214) into a playable audio production and the audio production may be played (step 216).

Figure 3:
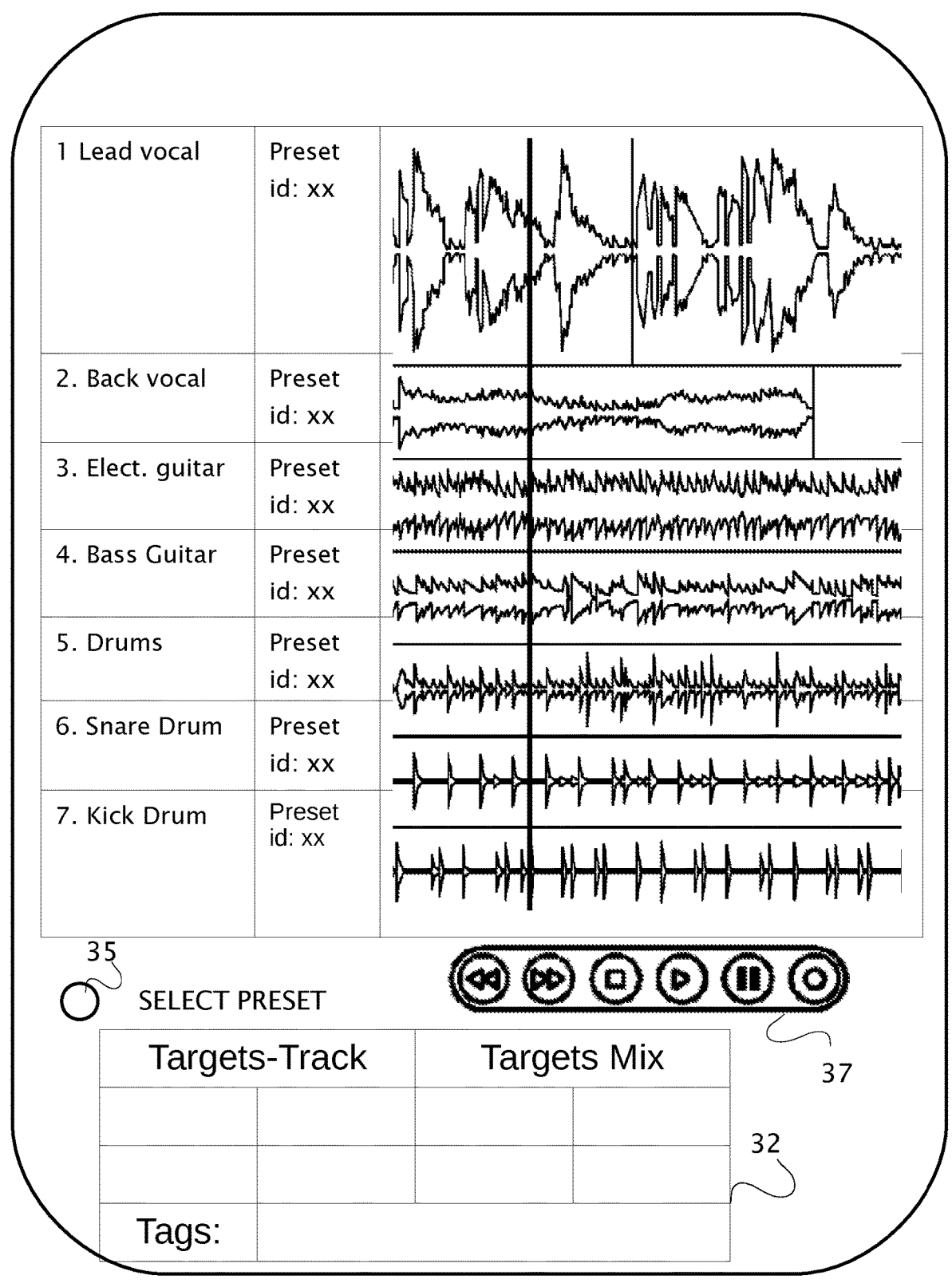
FIG. 3 illustrates schematically aspects of a screen shot of a graphical user interface showing features of the present invention.

Reference is now made to FIG. 3, which illustrates schematically a portion of a graphical user interface 30 of a digital audio workstation, according to features of the present invention. Audio tracks 1-7 are represented in graphical user interface 30, by way of example. Targets including individual track targets and/or targets of the audio mix may be entered manually in a table 32. Alternatively or in addition, targets may be suggested to the user in table 32 by processing the audio tracks received from the user. Tags, keywords and/or free text may be entered in a field in table 32. A select preset button 35 may be used to direct a trained machine to select from database 113 a preset for audio processing of the audio tracks responsive to the targets. Upon selection of a preset, preset ID numbers xx may then be specified and presented to the user. The user may select audio tracks processed according to the selected preset to be mixed and played using play controls 37.

Example: General Recommendation of Preset Based on Feature Metrics

According to features of the present invention a machine may extract a feature vector from an audio track 201 and compare the extracted feature vector to previously analyzed feature vectors stored in database 113 using a distance metric (for example, Euclidean distance). When the closest stored feature vector is found, the associated preset may be recommended (step 25) to process audio track 201. Recommendation 207 may be subsequently refined by for instance parameterizing and further minimizing the distance metric Example: Use of Tags or Free Text In addition to target audio features 205 as input, the machine may use, alternatively or in addition, tags 101 which may be free text predicting a desired recommendation. Tags 101 may describe the music genre, style of playing, emotional description, et cetera. Text tags 101 may serve as an input (step 18, FIG. 1) to train the machine and tags 101 may be used as an input to select (step 25) a recommendation 207 from database 113.

Example: Mix Oriented Recommendation of Preset

When all audio tracks 201 for mixing are provided, the machine may relate to the audio mix in order to select (step 25) an optimal preset based on audio track features and audio mix features or combinations thereof.

Example: Automatic Preset for Whole Mix/Master Effect

Master channel audio contains mixed audio of all tracks and may be compared to the presets stored in database 113. The comparison may use a distance metric and yield a recommendation for the mixed master channel and the selected preset may include processing that is recommended for the entire mix.

Neural Network

Referring back to FIG. 2, method 20 for selecting a recommendation 207 from a preset database 113 may utilize a neural network. The neural network includes an input layer to which may be input audio tracks 201 from a user with/without audio preprocessing (step 21). The neural network may be used to analyze raw audio or a preprocessed audio such as short time Fourier transform (STFT) or Mel-spectrum Cepstral coefficients (MFCC). The neural network may include one or more hidden layers for extracting audio features 205. The network may be previously trained on one or more different loss functions.

Neural Network Training Procedure

Network training may be performed in multiple stages. The network may be trained for general classification of audio content such as voice, music vocal/instrumental, genre, period, by way of example. The general classification may use the first layer(s) of the neural network.

Stored tags 101 and any available data such as free descriptive text may be input to the neural network to obtain context of the whole song and provide distinguishing characteristics for the stored presets.

Preprocessing (Step 21)

Although one dimensional data input, i.e. microphone signal as a function of time, may be used, the audio may be parsed and transformed into two dimensions using short time Fourier transform (STFT). Alternatively, as part of preprocessing frequency logarithmic wrapping may be performed using MFCC or Mel-scale. The amplitude may be compressed logarithmically as well. Transforming audio data to two dimensions facilitates use of convolutional neural networks which were originally developed for two dimensional image processing.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, transitory and/or non-transitory which is accessible by a general-purpose or special-purpose computer system. By way of example, and not limitation, such computer-readable media can comprise physical storage media such as RAM, ROM, EPROM, flash disk, CD-ROM or other optical disk storage, magnetic disk storage or other magnetic or solid state storage devices, or any other media which can be used to carry or store desired program code means in the form of computer-executable instructions, computer-readable instructions, or data structures and which may be accessed by a general-purpose or special-purpose computer system.

The term "audio track" as used herein refers to an audio signal which may be mixed or combined with other audio tracks to produce a playable audio production.

The term "original" audio track refers to an audio track as recorded or synthesized prior to digital signal processing.

The term "target" as used herein refers to a dependent variable and value thereof in an optimization problem or in machine learning which represents a desired outcome specified by or on behalf of the user.

The term "user interface" as used herein includes a "graphical user interface" which may be implemented on a display to a user and/or a hardware user interface and/or combination thereof.

The term "similarity" as used herein refers to a distance metric in feature space between an extracted audio feature of a processed audio track and a target audio feature; and/or a distance metric in feature space between a target feature of the audio mix and an extracted/received feature of the audio mix.

The terms "feature", "audio feature" as used herein refers to data extracted from an audio signal for classification or performing similarity measures. The term "feature extraction" as used herein refers to the process of extracting features from the audio signal.

The term "tag" as used herein refers to a user input which may be previously defined text or free text which describes an attribute of the audio tracks to be processed using the recommendation system according to an embodiment of the present invention.

The term "attribute" of audio tracks and/or mix as used herein refers to musical genre, style of playing, emotional description, instruments by way of example.

The indefinite articles "a", "an" is used herein, such as "an audio track", "a recommendation" have the meaning of "one or more" that is "one or more audio tracks" or "one or more recommendations".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The claimed invention is:

1. A method, whereby a plurality of training audio tracks is provided to a human sound mixer and responsive to the training audio tracks a plurality of individually processed training audio tracks is received from the human sound mixer, the method comprising:
   inputting a plurality of original audio tracks to a trained machine;
   inputting a target audio feature for processing the original audio tracks;
   extracting a plurality of audio features from the original audio tracks;
   responsive to the extracted audio features of the original audio tracks and the target audio feature, selecting a recommendation from a database for individual audio processing of the original audio tracks;
   wherein the trained machine is produced by:
   inputting the training audio tracks and the individually processed training audio tracks to a machine thereby training the machine;
   outputting from the trained machine a plurality of audio processing operations respectively emulating human audio processing of the training audio tracks; and
   storing in a record of a database the audio processing operations.

2. The method of claim 1, further comprising:
   extracting a plurality of audio features of the training audio tracks; and
   storing the audio features of the training audio tracks in a record of the database.

3. The method of claim 2 further comprising:
   presenting the recommendation;
   enabling processing of the original audio tracks according to the recommendation;
   enabling mixing the processed audio tracks into a playable audio production; and
   enabling playing the audio production;
   wherein said selecting a recommendation from a database is responsive to a similarity metric between the extracted audio features of the original audio tracks and the extracted audio features of the training audio tracks.

4. The method of claim 3, further comprising:
   inputting a tag describing an attribute of the audio tracks or of the playable audio production; and
   said selecting a recommendation further responsive to the tag.

5. The method of claim 1, whereby an audio mix is received from the human sound mixer of the individually processed training audio tracks, the method further comprising:
   extracting an audio mix feature of the audio mix;
   storing the audio mix feature in a record of the data base.

6. The method of claim 5, further comprising:
   receiving a target feature of the audio mix;
   further responsive to the audio mix feature of the audio mix stored in the database and the target feature of the audio mix, said selecting a recommendation for audio processing of the original audio tracks.

7. The method of claim 1, further comprising, prior to inputting the original audio tracks to the trained machine:
   pre-processing the original audio tracks by a short time Fourier transform (STFT) or by converting into Mel Frequency Cepstral Coefficients (MFCC).

8. The method of claim 1, further comprising:
   processing the original audio tracks according to the recommendation, producing thereby individually processed audio tracks;
   extracting an audio feature of the individually processed audio tracks; and
   refining said recommendation responsive to the extracted audio feature of the individually processed audio tracks and a target audio feature input.

9. A system, whereby a plurality of training audio tracks is provided to a human sound mixer and responsive to the training audio tracks a plurality of individually processed training audio tracks is received from the human sound mixer, the system comprising:
   a trained machine configured to input a plurality of original audio tracks and a target audio feature for processing the original audio tracks;
   wherein a processor is configured to extract a plurality of audio features from the original audio tracks;
   wherein responsive to the extracted audio features of the original audio tracks and the target audio feature, the processor is configured to select a recommendation from a database for individual audio processing of the audio tracks;

wherein the trained machine is produced by:
inputting the training audio tracks and the individually processed training audio tracks, and;
outputting a plurality of audio processing operations respectively emulating human audio processing of the training audio tracks; and
wherein the database is configured to store the audio processing operations.

10. The system of claim 9, further comprising:
a processor configured to extract audio features of the training audio tracks;
wherein the audio features of the training audio tracks are storable in a record of the database.

11. The system of claim 9, wherein the processor is further configured to:
present the recommendation;
enable processing of the original audio tracks according to the recommendation;
enable mixing the processed audio tracks into a playable audio production; and
enable playing the audio production;
wherein the recommendation is selected from the database responsive to a similarity metric between the extracted audio features of the original audio tracks and the extracted audio features of the training audio tracks.

12. The system of claim 9, wherein the recommendation is selected based on a similarity between the target audio feature and at least one of the extracted audio features of the training audio tracks.

13. The system of claim 9,
whereby an audio mix is received from the human sound mixer of the individually processed audio tracks,
wherein an audio mix feature is received or extracted from the received audio mix, and
the audio mix feature is stored in a record of the database.

14. The system of claim 13, wherein the recommendation is selected based on a similarity between a target feature of the audio mix and the audio mix feature of the audio mix stored in the database.

15. The system of claim 9, further comprising a user interface including:
a visual representation of the original audio tracks;
a presentation of the recommendation;
a mechanism for processing individually the audio tracks according to the recommendation into a playable audio production; and
an option for playing the audio production.

16. The system of claim 15, wherein the user interface further includes:
a mechanism configured to input the target audio feature.

* * * * *